US006953612B2

(12) United States Patent
Spoerle

(10) Patent No.: US 6,953,612 B2
(45) Date of Patent: Oct. 11, 2005

(54) TRIM PART

(75) Inventor: Frank Spoerle, Leonberg (DE)

(73) Assignee: DaimlerChrysler AG, Stuttgart (DE)

(*) Notice: Subject to any disclaimer, the term of this patent is extended or adjusted under 35 U.S.C. 154(b) by 133 days.

(21) Appl. No.: 10/127,424

(22) Filed: Apr. 23, 2002

(65) Prior Publication Data

US 2002/0108698 A1 Aug. 15, 2002

Related U.S. Application Data

(62) Division of application No. 09/313,347, filed on May 18, 1999, now Pat. No. 6,398,890.

(30) Foreign Application Priority Data

May 19, 1998 (DE) ........................................ 198 22 425

(51) Int. Cl.[7] ................................................ B60R 13/02
(52) U.S. Cl. ......................... 428/15; 428/31; 428/542.2
(58) Field of Search ......................... 428/15, 31, 542.2; 125/1

(56) References Cited

U.S. PATENT DOCUMENTS 3,716,508 A * 2/1973 Lewis et al. .................. 522/40
4,952,445 A * 8/1990 Dillon ........................ 428/156
4,975,493 A * 12/1990 Blum
5,004,512 A * 4/1991 Fodera ....................... 156/153
5,069,015 A * 12/1991 Steinwender ................ 52/575
5,078,815 A 1/1992 Othon
5,135,987 A * 8/1992 Wamprecht et al.
5,375,385 A * 12/1994 Feder .......................... 52/384
5,393,377 A * 2/1995 Pasaran et al.
5,494,548 A * 2/1996 Baca ........................... 428/45

FOREIGN PATENT DOCUMENTS

DE 37 27 157 A1 2/1989
DE 41 34 373 A1 4/1993
EP 0 122 357 A1 10/1984
FR 2 643 023 8/1990
JP 63042857 A * 2/1988 ............. B32B/3/12
JP 4-118694 10/1992
JP 4-130900 12/1992

OTHER PUBLICATIONS

English Translation of JP 63–42857.*
Copy of Japanese Office Action and English translation.

* cited by examiner

*Primary Examiner*—John T. Haran
(74) *Attorney, Agent, or Firm*—Crowell & Moring LLP

(57) ABSTRACT

In a trim part for decorative purposes, especially in the interior, and in this case preferably for the interior trim of the passenger compartments of vehicles, a cover layer of natural stone is applied to the visible side of a base part. For this purpose, the negative shape of the base part is machined from a natural stone block and the two are combined permanently to form a sandwich. Then the surface is machined on the visible side, and finally clear lacquer is applied.

8 Claims, 2 Drawing Sheets

TRIM PART

BACKGROUND AND SUMMARY OF THE INVENTION

This application is a division of application Ser. No. 09/313,347, filed May 18, 1999, now U.S. Pat. No. 6,398,890.

This application claims the priority of German patent document No. 198 22 425.7, filed May 19, 1998, the disclosure of which is expressly incorporated by reference herein.

The invention relates to a trim part for decorative purposes, especially for the interior trim of passenger compartments of vehicles, as well as to a method for manufacturing such a trim part.

The use of natural materials such as wood, wood veneer, leather, textiles and the like for decorating interiors is generally known, especially also for the interior trim of passenger compartments of vehicles. During manufacture, the natural material is frequently applied as a cover layer to the visible side of a base part that faces the observer.

The disadvantage of using these materials is a limited freedom of design, since only a limited number of patterns and color variations are available. This is especially true of materials that are generally associated with the concepts of exclusivity and luxury, such as burl walnut for example.

The object of the invention is to provide a trim part having a decorative cover layer for which there are many different design possibilities and which also lends the interior of the vehicle an exclusive character, with no increase in cost or manufacturing technology compared with the previously conventional possibilities.

This and other objects and advantages are achieved by the trim part according to the invention, in which a cover layer of natural stone is applied to the visible side of a base part. The trim part is manufactured by machining a negative shape of the base part from a block of natural stone and joining the machined stone to the base part to form a sandwich. The exposed stone surface is then machined and lacquered.

An advantageous novel decorative effect is achieved by using a cover layer made of natural stone. Because of the rich variety of kinds of stone, of which approximately 6000 would be basically suitable for the purpose, there are many variations in pattern and color. A few types of stones even have luminescence effects, thus permitting considerable freedom of design.

Another advantage is that, depending on the type of stone, only a limited cost of raw materials can be incurred since even debris from construction activity may be used.

The freedom from rot and corrosion of the cover layer made of natural stone is also advantageous, so that it can be used not only in the interior area but also in the exterior area.

Natural stone as such offers the designer several very attractive properties. With material inclusions, such as feldspars for example, noble metals, or organic matter, a unique depth effect is produced that cannot be achieved by the use of synthetic materials.

Moreover, stone, especially the types that contain lime, exhibits very impressive optical properties. Thus for example, in a few types of marble with organic inclusions, light is emitted again on a different wavelength, staggered in time. The stone, which is actually white, glows in green veins after the light is shut off.

Another example is a fine-grained gray granite known as Blue Eyes, which glows with an intense blue light depending on the way it is struck by light. In order to utilize optimally the depth effect and the optimum effects of the natural stone, the use of monolithic natural stone blocks for making trim parts and trim strips according to the method of the invention is especially attractive.

Due to the efficiency with which the natural stone can be worked, the manufacturing method according to the invention does not result in any price disadvantage relative to wood. In fact, the eventual costs can even be reduced, with the price of the starting material being more favorable on the average.

Connecting the natural stone with the base part before final machining has the advantage that impacts or bending moments during handling, machining of the visible side of the cover layer, or assembly of the natural stone, the stone is not prone to destruction as would be a thin layer of natural stone by itself. The base part acts as a sort of protection or reinforcement for the natural stone.

Other objects, advantages and novel features of the present invention will become apparent from the following detailed description of the invention when considered in conjunction with the accompanying drawings.

DETAILED DESCRIPTION OF THE DRAWINGS

FIGS. 1 to 4 show the trim part and the manufacturing method in a schematic form.

Figure 1:
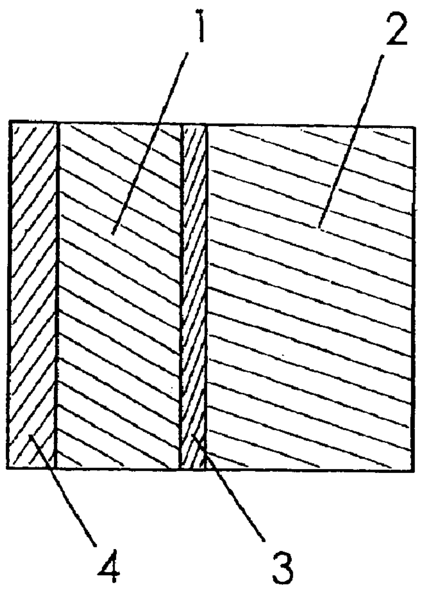
FIG. 1 is a schematic diagram of a trim part according to the invention.

According to the enlarged view in FIG. 1, a thin layer of natural stone 1 is connected with a base part 2 by an adhesive layer 3. A clear lacquer layer 4 is applied as a seal on the visible side. Alternatively, the base part 2 can be made of cast aluminum. This part is connected by an adhesive layer 3, a thermal-stress-accepting foam adhesive, or a two-component adhesive, with natural stone layer 1.

In view of the thinness of the layer of natural stone 1 (minimally possible order of magnitude of approximately 1 mm), the increase in weight of the decorative trim parts relative to the use of wood, plastic, metal, or metal oxide cover layers is negligible. Moreover, the thin layer of natural stone also makes it possible to illuminate the stone from behind using a light-guiding base part, for example made of polymethylmethacrylate, providing additional design possibilities.

The application of clear lacquer 4 is best accomplished by spraying a layer of insulating lacquer and a final thick layer of polyester lacquer. The purpose of the insulating lacquer is to keep the sealing thick-layer polyester lacquer from entering the open stone pores, not curing therein, and reaching the opposite side of the natural stone layer 1 by diffusion effects. In this case, there would be the danger that adhesive layer 3 would be attacked by polyester lacquer containing solvent and eventually destroyed.

The thick layer of polyester lacquer used to seal the visible surface of the decorative natural stone cover layer 1 accepts all rough spots left by machining. The exposed visible side is then smooth and free of structures, and can be readily polished so that it is glossy by comparison with its surface roughness. In comparison to polishing followed by sealing a natural stone surface with wax, as is generally conventional, the coating of the surface with lacquer and polishing result in considerably less manufacturing effort and cost.

In the event of an impact caused by an accident or destruction of the trim part, a viscoelastic clear lacquer 4 holds the splinters together or at least on the base part.

Figure 2:
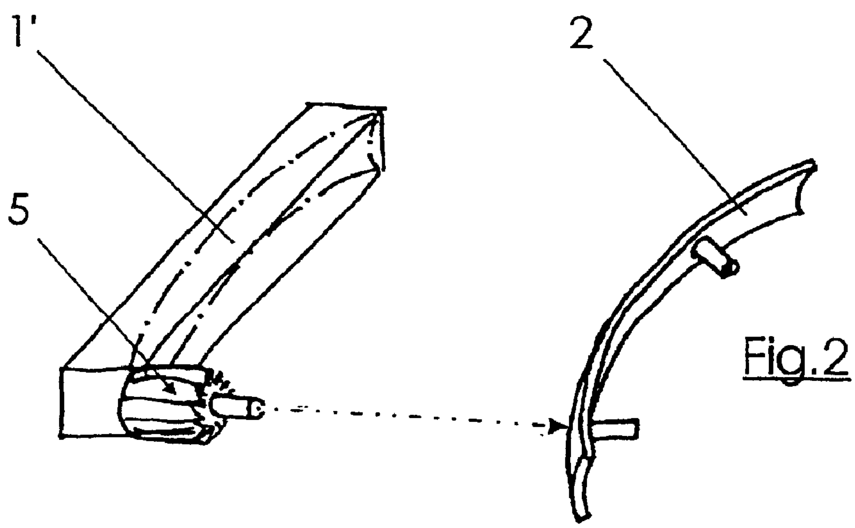
FIG. 2 shows the shape of the base part being hollowed out from the back of the natural stone block.

FIG. 2 shows how the surface shape of the base part 2 is machined by means of a mill 5 by negative profiling. By milling a natural stone block 1', a manufacturing method is employed which does not exceed the manufacturing and financial cost of working with wood or metal.

Figure 3:
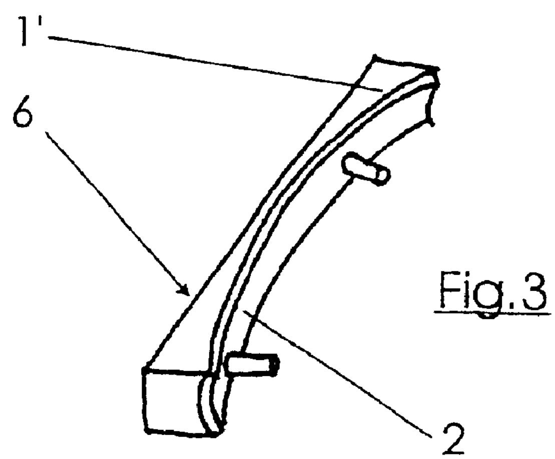
FIG. 3 shows a sandwich made of the base part and the partially machined natural stone block.

FIG. 3 then shows the sandwich 6 permanently formed from partially machined natural stone block 1' and base part 2 by gluing. The thin natural stone layer 1 which must then be profiled is already connected with base part 2 before being machined further.

Figure 4:
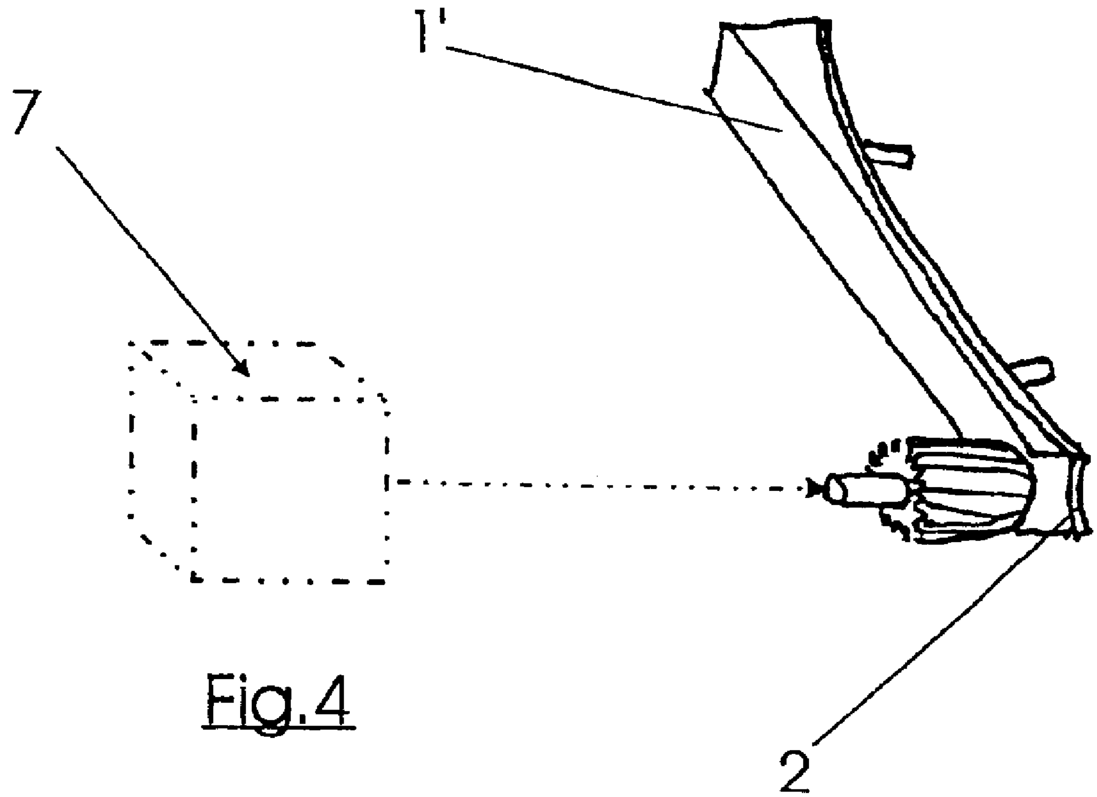
FIG. 4 shows how the visible surface shape of the natural stone is hollowed out.

FIG. 4 shows the machining of the surface shape of sandwich 6 on the visible side. For this purpose, a new numerically controlled free-form milling tool 7 may be used. In this manufacturing step, sandwich 6 is mounted above base part 2 by the clamping device of free-form milling tool 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A decorative trim part having a three-dimensional surface contour, said trim part comprising:

a base part having a mounting surface with a three-dimensional surface contour;

a cover layer of natural stone material having a thickness that is on the order of magnitude of one millimeter, and having a three-dimensional outer surface contour that defines said three-dimensional surface contour of the trim part, said layer of natural stone material also having a machined three-dimensional mounting surface that conforms to the three-dimensional surface contour of the base part without bending of said natural stone material; and an adhesive layer that bonds the mounting surface of the natural stone material to the mounting surface of the base part.

2. The decorative trim part according to claim 1, wherein the cover layer of natural stone forms a trim strip.

3. The decorative trim part according to claim 1, wherein the cover layer of natural stone has a thin light-permeable layer thickness.

4. The decorative part according to claim 3, wherein in order to illuminate the decorative cover layer from the back, at least one of the base part and adhesive layer between the cover layer of natural stone and base part comprises a material that is completely or partially translucent or transparent.

5. The decorative part according to claim 1, further comprising at least one layer of clear lacquer on a visible side of the cover layer.

6. The decorative part according to claim 5, wherein the dear lacquer layer is viscoelastic.

7. The decorative trim part according to claim 1 , further comprising:

a first layer of insulating lacquer applied on a visible surface of the natural stone material; and a second layer of polyester lacquer applied on said first layer of insulating lacquer.

8. The decorative trim part according to claim 7, wherein said second layer is relatively thicker than said first layer.

* * * * *